United States Patent [19]

Gessler

[11] Patent Number: 4,563,273
[45] Date of Patent: Jan. 7, 1986

[54] PROCESS AND APPARATUS FOR SEPARATING FINES FROM MICELLA STREAMS

[75] Inventor: Donald A. Gessler, Verona, Pa.

[73] Assignee: Dravo Corporation, Pittsburgh, Pa.

[21] Appl. No.: 248,046

[22] Filed: Mar. 27, 1981

[51] Int. Cl.⁴ ............................................. B01D 29/04
[52] U.S. Cl. ...................................... 210/94; 210/209;
210/251; 210/435; 210/499; 210/259
[58] Field of Search ............... 210/94, 328, 407, 435, 210/451, 499, 251, 252, 205, 207, 209–215, 259; 422/261, 268, 274

[56] References Cited

U.S. PATENT DOCUMENTS

| 1,861,537 | 6/1932 | Leek | 210/328 |
| 2,840,459 | 6/1958 | Karnofsky | 422/268 |
| 3,372,807 | 3/1968 | Barnard | 210/94 |

Primary Examiner—Ivars Cintins
Attorney, Agent, or Firm—Louis E. Marn

[57] ABSTRACT

There is disclosed a screening assembly for separating fines from a miscella stream including same and comprised of a screening element angularly disposed in a housing assembly beneath an inlet conduit means and over a miscella collection zone.

15 Claims, 3 Drawing Figures

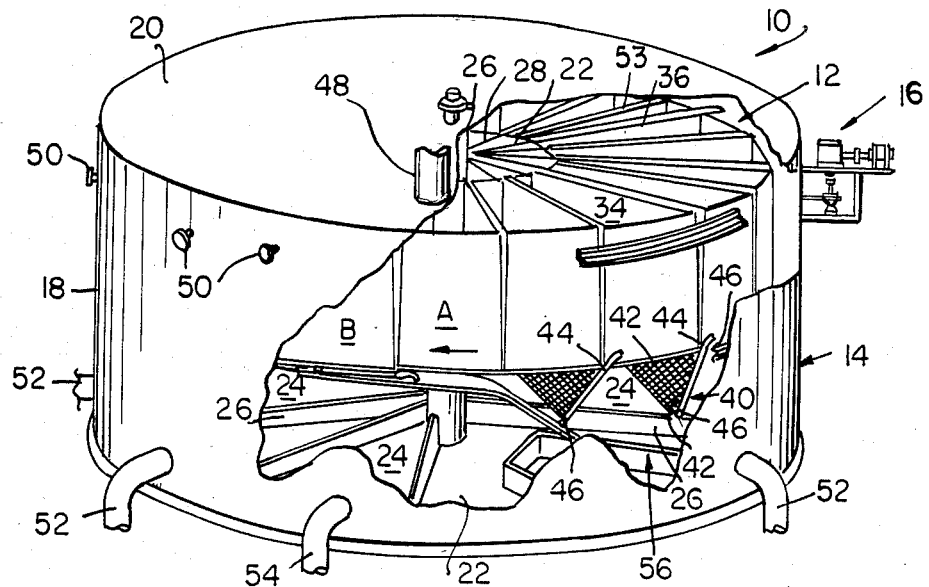
FIG.1
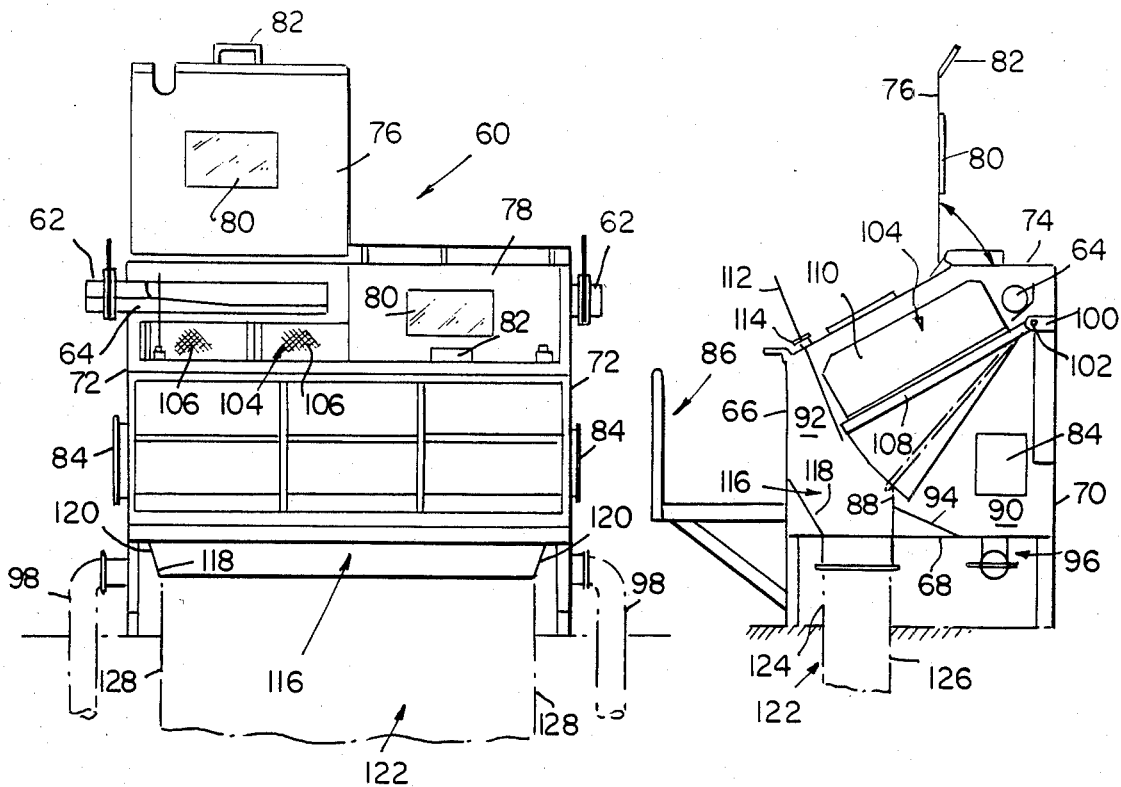
FIG.2
FIG.3

PROCESS AND APPARATUS FOR SEPARATING FINES FROM MICELLA STREAMS

FIELD OF THE INVENTION

This invention relates to a process and apparatus for solvent extraction, and more particularly to a process and apparatus for separating fines from miscella streams obtained by the solvent extraction of particular solids, such as crushed sugar cane, wood chips and the like.

BACKGROUND OF THE INVENTION

In U.S. Pat. No. 2,840,459, assigned to the same assignee as the present invention, there is disclosed a process and apparatus for the continuous extraction of oils and/or soluble materials from particulate materials comprised of a large vessel forming a vapor-tight enclosure in which there is disposed a rotor including a plurality of cells formed by radially-disposed inner walls extending toward and mounted to peripherally-disposed end walls. A plurality of fluid manifold assemblies are radially-disposed above the cells in a preselect manner to permit the introduction of miscella and solvent stream into the cells, generally to effect a counter-current extraction utilizing percolation techniques. The bottom of each cell is provided with a hinged-door assembly including associated equipment for opening and closing each cell. Drainage compartments generally underlie the cells for collecting miscella, i.e. a solution of oil and solvent for recycle within the apparatus and eventual withdrawal as described in such aforementioned U.S. patent.

Generally, above one compartment proximate the point of introduction of solids into extractor wherein such solids are contacted with concentrated miscella to form a more concentrated miscella recovered for subsequent separation into extract and solvent, there is provided an inverted V-shaped screen to separate fines from the primary flow of miscella flowing therethrough. The fines together with minor quantities of miscella are caused to flow off the screen into adjacent miscella compartments from which the miscella streams including fines are passed to preselect manifold assemblies for introduction into the cells whereby the fines are essentially filtered into the percolation bed of solids.

In the treatment of shredded sugar cane to extract sugar by the formation of a diffuser juice, the consistency of the shredded cane results in build-up on the inverted V-shaped screen member eventually resulting in blockage and eventual shut-down of extractor operation to permit manual cleaning of such screen member with concomitant reduction in production rates.

OBJECT OF THE INVENTION

An object of the present invention is to provide a novel process and apparatus for removing fines from miscella obtained by the solvent extraction of particulate solids by percolation techniques.

Another object of the present invention is to provide a novel process and apparatus for removing fines from miscella obtained by the solvent extraction of particulate solids by percolation techniques while minimizing recycle of concentrated miscella.

Still object of the present invention is to provide a novel process and apparatus for removing fines from miscella obtained by the solvent extraction of particulate solids by percolation techniques and external of the solvent extractor.

A further object of the present invention is to provide a novel process and apparatus for removing fines from miscella obtained by the solvent extraction of particulate solids by percolation techniques permitting of preselect controlled fines removal while minimizing losses of concentrated miscella.

Yet are other object of the present invention is to provide a novel process and apparatus for removing fines from miscella obtained by the solvent extraction of particulate solids by percolation techniques while permitting of continued on-stream operation of the solvent extractor.

A still further object of the present invention is to provide a novel process and apparatus for removing fines from miscella obtained by the solvent extraction of particulate solids by percolation techniques together with facile visual operations of the fine build-up to permit initiation of cleaning procedures.

Another object of the present invention is to provide a novel process and apparatus for removing fines from miscella obtained by the solvent extraction of particulate solids by percolation techniques permitting of visual observation to maximize fines removal.

An additional object of the present invention is to provide a novel process and apparatus for removing fines from miscella obtained by the solvent extraction of particulate solids by percolation techniques permitting of facile replacement of a fines removal member.

SUMMARY OF THE INVENTION

These and other objects of the present invention are achieved by a process and appartus wherein miscella including fines withdrawn from the extractor is introduced into a screening assembly including a screen member capable of angular adjustment toward which screen member the miscella including fines is directed with the miscella passing therethrough being collected and withdrawn for further processing and with fines removal from the screen member being effected as required and determined by visual obseration with the separated fines being recovered and processes as desired.

BRIEF DESCRIPTION OF THE DRAWING

A better understanding of the present invention as well as other objects and advantages thereof will become apparent upon consideration of the detailed disclosure thereof, especially when taken with the accompanying drawings wherein:

FIG. 1 is an isometric view, partially cutaway, of a rotary solvent extract;

FIG. 2 is an elevational view of the housing assembly; and

FIG. 3 is a schematic side view taken along the lines 3—3 of FIG. 2.

DETAILED DESCRIPTION OF THE INVENTION

Referring now to FIG. 1, there is illustrated a rotary solvent extractor, generally indicated as 10, comprised of a spool frame rotor disposed within a vessel and driven by a motor and gear reduction assembly, generally indicated as 12, 14 and 16, respectively. The vessel 14 is formed of a generally cylindrically-shaped casing 18 enclosed by a flat head 20 and a generally conically-shaped bottom wall 22 sloping downwardly from a center to solvent collection zones, generally indicated as 24, formed by vertically-disposed plate member 26. Generally, if the rotary extractor 10 is to be used in a solvent extraction process wherein solvent losses are to be minimized or prevented, the vessel 14 is sealed concomitantly permitting operation at below or above atmospheric pressure, if desired.

The spool frame rotor 12 includes a rotor shaft 28 on which are radially-mounted support beams 30 for positioning a plurality of radially extending, vertically-disposed paired side walls 32 forming cells, generally indicated as 34, with inner walls 36 and outer end walls 38. Each cell 34 is open at the top and substantially sector-like in plan and is provided at the bottom thereof with a trapezoidally-shaped, hingedly attached cell door assembly, generally indicated as 40, including screen member 42 of a preselect size for the material being treated.

A hinge rod 44 is provided on each cell door assembly 40 positioned about an edge adjacent the bottom of each cell to enable the cell door assembly 40 to swing about the lower leading edge thereof. Journalled on the respective ends of the cell door assemblies 40 are rollers 46 adapted to be supportably engaged by track 46 adjacent each end of the cell 34 for that portion of the path of rotation during which the cell door assemblies 40 are maintained in substantially closed position.

The flat head 20 is provided with a solids inlet chute 48 for introducing the particulate solids to be treated into the cells 34 of the rotary extractor 10. A plurality of fluid or miscella inlets flanges 50 are provided in fluid communication with a plurality of manifold assemblies 53 (one shown) radially positioned alone the spool frame 12 in a predetermined flow pattern to effect countercurrent contact between particulate solids and solvent and/or miscella streams. A plurality of fluid conduit 52 are provided in fluid communication with the various solvent collecting zones for recirculation of various miscella stream to the manifold assembly and with an outlet fluid conduit 54 for withdrawing for further processing, a concentrated miscella stream including fines.

The concentrated miscella including fines withdrawn by conduit 54 from the rotary extractor 10 is passed to a screen housing assembly, generally indicated as 60, referring now to FIGS. 2 and 3, and include inlet conduits 62 and fluid distributor 64 (one shown). The screen housing assembly 60 is comprised of a front wall 66, a bottom wall 68, a back wall 70, side walls 72 and a top wall member 74 to which are hingedly mounted, right and left top door panels 76 and 78, respectively, including viewing panels 80 and handles 82. The side walls 72 are provided with viewing ports 84, with a platform, generally indicated as 86, being provided proximate the front wall 66 of the screen housing assembly 60.

Interior of the screen housing assembly 60, there is provided an intermediate upstanding lower inner wall member 88 longitudinally-disposed along the screen housing assembly 60 dividing the screen housing assembly 60 into a miscella collection zone and a fines collection zone, generally indicated as 90 and 92, respectively. The miscella collection zone 90 is formed by the inner wall number 88 and lower portions of the bottom, back and side walls 68, 70 and 72 respectively, including a sloping interior plate member 94. The bottom wall 68 is provided with a trough assembly, generally indicated as 96, in fluid communication with liquid outlet conduits 98.

Mounted to the back wall 70 of the screen housing assembly 60, there is provided a support member 100 including a shaft 102 for hingeably mounting screen members, generally indicated as 104 (one shown), mounted in side-by-side relationship. Each screen member 104 is comprised of a screen element 106 of preselect mesh suitably mounted on a support assembly 108, end wall member 110 and a screen angle control rod 112. The screen angle control rod 112 is positioned within an adjustment conduit 114. The screen member 104 may be angularly disposed within the screen housing assembly 60 at an angle of from 55° to 40° to the vertical, as more fully hereinafter discussed, with the angle being adjusted by raising or lowering the screen angle control rod 112.

Below the fines collection zone 92 of the screen housing assembly 60, there is provided a chute, generally indicated as 116, formed with an inlet thereto by the inner wall member 88, an intermediate lower wall member 118 mounted to the front wall 66 and inwardly sloping side wall members 120 leading to a main chute 122 comprised of front wall 122, back wall 126 and side walls 128.

In operation, particulate solid material to be treated, such as crushed sugar cane, is introduced into the rotary extractor 10 at cell position A at a rate to fill each empty cell 34 to a predetermined level determined by processing conditions, etc., with the spool frame 12 rotating in a clockwise direction. A concentrate miscella from a proceeding solvent collection zone 24 is thereafter caused to be introduced at cell position B at a predetermined rate to effect contact therebetween with the further resulting concentrated miscella draining into the miscella collection zone 26 therebeneath for withdrawal by conduit 54 for further processing. Since the particulate solids to be treated do not form a percolation bed thereof until contact with the liquid fines are proned to be produced which pass through the screen 42 of a cell door assembly 40, and thus are withdrawn from the rotary extractor 10 together with the concentrated miscella in conduit 54.

Rotation of spool frame rotor 12 is continued with the solids being contacted with miscella of lesser concentration and eventually with fresh solvent. Generally, contact is effected under flooding rates with collection zones dimensioned to effect most efficacious collection of miscella of varying concentration. Generally, the last contact between liquid and particulate solids is effected at a point to permit substantial drainage of miscella from the particulate solids prior to the cell 34 reaching a point at which the roller 46 of the leading edge of the cell door assembly 40 leaves the rail 46 to cause the cell door assembly 40 to open by gravity thereby emptying the solvent extracted material into a solid outlet chute, generally indicated as 56, and thence onto a suitable convey assembly (not shown) for further processing.

The diffuser juice including particulate solids withdrawn by conduit 54 from the extractor 10 is passed by gravity through conduits 62 and into the fluid distributors 64 of the screen housing assembly 60 and is caused to flow onto the screen elements 106 of the screen member 104 disposed at an angle of 55° to the vertical. The miscella or diffuser juice pass through the openings in the screen elements 106 while the solids are caused to be separated and collected on the screen elements 106.

To remove collected solids from the screen element 106, the control rod 112 is caused to be lowered thereby lowering the screen member 104 to 40° angle to the vertical whereby the collected solids caused to fall by gravity off the screen elements 106 and through the chute 122 for further processing. Solids removal may be accelerated by use of a squeeze type device (not shown) for manual removal from the screen elements 106 after raising the covers 76 to permit access to the screen 106. Additionally, it will be appreciated that facile access to the distributor 64 permits ready sampling of the diffuser juices for process control.

The process and apparatus of the present invention is applicable to use with solvent extraction vessels, preferably of the rotary type, although not necessarily limited thereto. Additionally, the process and apparatus of the present invention is generally applicable to solvent extraction where solvent handling is not critical, i.e. water for extracting sugar from sugar cane as distinguishes from the use of hexane for extracting oil from soybean. Thus, the extraction vessel need not be enclosed, although generally desirable from an overall hygienic standpoint.

The process and apparatus of the present invention permits, inter alia, of continued extractor operation with no restrictions to production down-time, permits of flexibility to modify screening capacity by adding additional units, when required, and of facile screen replacement.

While the invention has been described in connection with exemplary embodiment thereof, it will be understood that many modifications will be apparent to those of ordinary skill in the art; and that this application is intended to cover any adaptions of variations thereof. Therefore, it is manifestly intended that this invention be only limited by the claims and the equivalents thereof.

What is claimed:

1. A screening assembly for continuously treating a miscella stream including fines to substantially remove said fines from said miscella stream prior to treating miscella to recover solvent and an extracted product, which comprises:
    a housing assembly including a liquid recovery zone;
    inlet conduit means for continuously introducing said miscella stream including fines into said housing assembly, said inlet conduit means being disposed above said liquid recovery zone;
    screening assembly angularly disposed beneath said inlet conduit means and over said liquid recovery zone including screen means for continuously separating fines from said miscella stream;
    conduit outlet means for continuously withdrawing said miscella from said liquid recovery zone; and
    solid outlet conduit means for withdrawing from said housing assembly fines separated from said miscella stream.

2. The screening assembly as defined in claim 1 wherein said screening assembly is hingeally mounted beneath said inlet conduit means.

3. The screening assembly as defined in claim 2 wherein said screening assembly is positioned at an angle of from 40° to 55° with respect to the vertical.

4. The screening assembly as defined in claim 3 wherein said screening assembly is provided with a control rod for adjusting said angle of said screening assembly.

5. The screening assembly as defined in claim 1 wherein said housing assembly is enclosed by hingeably mounted cover elements.

6. The screening assembly as defined in claim 5 wherein said hingeably mounted cover element include viewing ports.

7. The screening assembly as defined claim 1 wherein said the inlet conduit, said liquid recovery zone and said screening assembly extend laterally across said housing assembly.

8. The screening assembly as defined in claim 1 wherein said solid outlet assembly extends laterally across said housing assembly juxtaposed to said liquid zone.

9. The combination of a solvent extractor for the extraction of a soluble component from particulate solids by an extraction solvent wherein particulate solids are contracted with a miscella to form a miscella stream including fines and including conduit means for withdrawing said miscella stream from said extractor for treatment to separate fines from said miscella stream; and
    a screening assembling comprising a housing assembly including a liquid recovery zone, inlet conduit means for continuously introducing said miscella stream including fines into said housing assembly, said inlet conduit means being disposed above said liquid recovery zone, screening assembly angularly disposed beneath said inlet conduit means and over said liquid recovery zone including screen means for continuously separating fines from said miscella stream, conduit outlet means for continuously withdrawing said miscella from said liquid recovery zone, solid outlet conduit means for withdrawing from said housing assembly fines separated from said miscella stream.

10. The combination as defined in claim 9 wherein said screening assembly is hingeably mounted beneath said inlet conduit means.

11. The combination as defined in claim 9 wherein said screening assembly is positioned at an angle of from to to 55° with respect to the vertical.

12. The combination as defined in claim 11 wherein said screening assembly is provided with a control rod for adjusting said angle of said screening assembly.

13. The combination as defined in claim 9 wherein said housing assembly is enclosed by a hingeably mounted cover element.

14. The combination as defined in claim 9 wherein said the inlet conduit, said liquid recovery zone and said screening assembly extend laterally across said housing assembly.

15. The combination as defined in claim 9 wherein said solid outlet assembly extends laterally across said housing assembly juxtaposed to said liquid zone.

* * * * *

UNITED STATES PATENT AND TRADEMARK OFFICE
CERTIFICATE OF CORRECTION

PATENT NO. : 4,563,273
DATED : January 7, 1986
INVENTOR(S) : Donald A. Gessler

It is certified that error appears in the above-identified patent and that said Letters Patent is hereby corrected as shown below:

In the Claims:

Claim 2, line 2, "hingeally" should read -- hingeably --; and

Claim 11, line 3, delete "to to" and substitute -- 40° to --.

Signed and Sealed this

Twenty-ninth Day of July 1986

[SEAL]

Attest:

DONALD J. QUIGG

Attesting Officer

Commissioner of Patents and Trademarks